3,839,501
MOLDABLE RUBBER BLENDS OF BLOCK AND CRYSTALLINE COPOLYMERS

Yung-Kang Wei and Eric George Kent, Sarnia, Ontario, Canada, assignors to Polymer Corporation Limited, Sarnia, Ontario, Canada
No Drawing. Filed Oct. 26, 1972, Ser. No. 300,898
Claims priority, application Canada, Dec. 20, 1971, 130,466
Int. Cl. C08f $15/00$, $19/00$
U.S. Cl. 260—876 B         9 Claims

ABSTRACT OF THE DISCLOSURE

Thermoplastic rubber of the A—(B—A)$_n$ type such as styrene-butadiene-styrene block copolymer is blended with a crystalline alternating copolymer of a conjugated alkadiene such as isoprene and acrylonitrile to produce an improved thermoplastic elastomeric composition. The composition is characterized by excellent moldability and satisfactory stress-strain properties at room and elevated temperatures in the unvulcanized state, and is suitable for use in the production of molded rubber goods.

---

This invention relates to moldable rubber compositions comprising a thermoplastic elastomer and a crystalline copolymer of a conjugated diene and a polar monomer and to molded rubber goods made of such compositions.

Thermoplastic elastomers such as block copolymers of styrene and butadiene have been used in the production of molded rubber goods. The block copolymers of the general formula A—(B—A)$_n$ where A is a resinous polymer bloc and B is an elastomeric polymer block and $n$ is a whole number from 1 to 3 are known to have satisfactory rubber elastic properties in the raw i.e. unvulcanized state. On heating to conventional temperatures encountered in rubber processing of about 80° C. or higher, they become plastic and can be extruded, pressure molded or otherwise shaped. For good rubber elastic properties, high tensile strength, modulus and elongation, it is desirable to use block copolymers of high molecular weight, preferably above 100,000. This requirement, however, is in conflict with the requirement that the copolymer be moldable at the conventional processing temperature; high molecular weight polymers are deficient in this respect.

Attempts have been made to resolve that problem of conflicting requirements by carefully controlling the molecular weight of block copolymers and/or by compounding with reinforcing fillers, plasticizing oils or resins or with a mixture of fillers and plasticizers. The results were not completely satisfactory; either the strength or moldability of the block copolymer was affected. Another deficiency of such block copolymer compounds was lack of oil-resistance.

The object of this invention is to provide thermoplastic elastomeric compositions which combine strength at low temperatures and moldability at higher temperatures.

A further object is to provide compositions having an improved oil-resistance. And yet another object of this invention is to provide an improved process for the production of molded rubber goods having improved properties in the unvulcanized state.

These and other objects of this invention have been achieved by providing a thermoplastic elastomeric composition comprising a blend of a thermoplastic elastomer and a crystalline copolymer of a conjugated alkadiene and an acrylic nitrile.

The thermoplastic elastomer which can be used in the composition of this invention may be any polymer which at room temperature can be stretched to double its original dimension and quickly returns to the original dimension when the stretching force is removed, but which on heating becomes plastic and workable on rubber processing equipment. Examples of such thermoplastic elastomers are ethylene-vinyl acetate copolymers, ethylene-propylene copolymers containing more than 70 mole percent of ethylene and block copolymers of ethylenically unsaturated aromatic compounds and conjugated alkadienes. The preferred thermoplastic elastomer is a block copolymer having the general formula A—(B—A)$_n$ where A is a resinous polymer block having a glass transition point or melting point of at least above 25° C. and B is an elastomeric polymer block having a glass transition point of less than about 0° C. Resinous block A may be polystyrene, polyalphamethylstyrene, poly(vinyl naphthalene), poly(vinyldiphenyl) and copolymers thereof, crystalline polyethylene or polypropylene, polyvinyl pyridine, polychlorostyrene or derivatives such as hydrogenated polystyrene, terminally hydroxylated or carboxylated polystyrenes. The elastomeric block B may be a rubbery homopolymer of a conjugated alkadiene such as butadiene-1,3 or isoprene or a random copolymer of butadiene and styrene, ethylene and propylene, or ethylene and butene.

The preferred block copolymers are polystyrene-polybutadiene - polystyrene, polystyrene-polybutadiene-poly (alphamethylstyrene, poly(alphamethylstyrene)-polybutadiene-poly(alphamethylstyrene) and corresponding copolymers with a rubbery polyisoprene block instead of polybutadiene. The preferred content of resinous blocks is from about 25 to about 65 percent by weight of the block copolymer. The molecular weight of the copolymer may range within wide limits from about 25,000 to about 1,000,000 although it is preferred to use block copolymers having a molecular weight of about 50,000 to 500,000.

The thermoplastic elastomers and processes for their production are well known in the art. For example, polystyrene-polybutadiene-polystyrene block copolymer is produced by the consecutive polymerization in the presence of a lithium hydrocarbyl catalyst of styrene, then butadiene followed again by styrene. The three-block copolymers can also be produced by coupling of monofunctionally reactive two-block copolymers of the A—B* type (*indicates reactive end) to form A—B—B—A which may simply be written as A—B—A.

The crystalline copolymer used in the composition of this invention is a copolymer of substantially equimolar amounts of a conjugated C$_{4-10}$ alkadiene and an acrylic nitrile. The conjugated alkadiene in this copolymer may be a 2-alkyl butadiene-1,3 containing 1–6 carbon atoms in the alkyl group such as isoprene, 2,3-dimethyl butadiene-1,3, 2-ethyl butadiene-1,3 or a mixture of not less than about 40 mole percent of 2-alkyl butadiene-1,3-with not more than 60 mole percent of another conjugated alkadiene containing 4–10 carbon atoms such as butadiene-1,3, pentadiene-1,3. The preferred alkadiene is a mixture of 50–100 mole percent of isoprene and 0–50 mole percent of butadiene-1,3. It is preferred that the alkadiene units in the copolymer are predominantly and preferably at least 75% in the trans-1,4 configuration. The acrylic nitrile used in the crystalline copolymer is selected from acrylonitrile, methacrylonitrile, alkyl substituted acrylonitriles containing 2–6 carbon atoms in the alkyl group, vinylidene cyanide, and methylene glutaronitrile, of which acrylonitrile is the most preferred. The nitrile units are arranged in an essentially alternating sequence with the alkadiene units so that the crystalline copolymers are free of contiguous units of the type: nitrile-nitrile, alkadiene-alkadiene, as can be determined by scanning the infra-red (I.R.) or nuclear magnetic resonance (N.M.R.) spectra.

The above alkadiene/nitrile copolymer is a solid material at temperatures of up to 50° C. and shows a crystalline content ranging from about 5% to about 35% as determined by conventional methods of measuring crystallinity such as X-ray diffraction, differential thermal analysis, dilatometry or infra-red spectroscopy. The results of different methods vary somewhat but in general they are comparable. For example, an alternating 1:1 copolymer of isoprene and acrylonitrile having about 95% of the isoprene units in the trans-1,4 configuration showed at room temperature the following crystallinity values:

Dilatometry: about 30%
Differential Thermal Analysis: about 33%
X-ray Diffraction: about 25%

Above the melting temperature which may range from about 60° C. to about 110° C., the solid copolymer softens to a viscous somewhat tacky mass which can be worked and shaped using conventional rubber processing equipment. On cooling to room temperature, the soft mass crystallizes and hardens. The rate of crystallization or hardening depends on the crystallinity level which in turn depends on the amount of 2-alkyl butadiene-1,3 content in the copolymer. The 1:1 copolymer of isoprene and acrylonitrile can crystallize within about 10 minutes while the alternating copolymer in which the alkadiene consists of an equimolar mixture of butadiene and isoprene may require up to 7 days at room temperature to reach the crystallinity range as specified above.

The crystalline copolymer used in this invention is a novel copolymer which can be prepared by the copolymerization of the described comonomers in a solvent in the presence of a complex catalyst comprising, for example, an organoaluminum halide complexed with an acrylic nitrile and a transition metal compound. There are various modifications of complex catalysts; their preparation and use in the production of amorphous alternating copolymers is described in British Patent Specifications 1,186,-462 and 1,231,327.

The two polymers, the thermoplastic elastomer and the crystalline copolymer, may be blended by any suitable means on a conventional rubber mill or in the internal mixer of the Banbury type. They can also be blended in solution and the mixture recovered therefrom. The polymers are combined in any ratio desired, but it is preferred to blend 5 to 75 parts by weight of the thermoplastic elastomer and correspondingly 25 to 95 parts by weight of the crystalline copolymer. The best results, however, are obtained when the thermoplastic rubber is blended with the crystalline copolymer in a proportion by weight from about 10/90 to 50/50.

Other compounding ingredients may be added; their selection will depend on the end use of the blend. For example, it may be desirable to mix the blend with other polymers such as styrene-butadiene elastomers, butadiene or isoprene elastomers, high styrene-butadiene resins, polystyrene or styrene-acrylonitrile resins. The amounts and the type of additives is adjusted so as to maintain good moldability and improve either rubber elastic properties or stiffness and hardness or both. It is preferable to use not more than 50 parts by weight of polymeric additives per 100 parts of the sum of the two essential polymers in the composition. The composition of this invention may contain a filler such as carbon black, silica, clays, calcium carbonate in amounts of less than about 50 parts by weight per 100 parts of the blend of the essential polymers. More can be used when the stiffening effect of such fillers is compensated by the addition of plasticizers, oils and solvents in amounts of up to 50 parts by weight. It is conventional to compound the polymer blend with antioxidants, colorants, pigments and, if desired, with vulcanization agents such as peroxides or sulfur vulcanization system.

The composition of this invention is a thermoplastic material that can be compression or injection molded, extruded, sheeted or otherwise handled at temperatures of about 100° C. or above to form molded goods, such as shoe soles, shoe uppers, household articles, hot melt adhesive tapes, especially where oil-resistance is required. When cooled to room temperature, the molded goods are firm and strong and have satisfactory rubber elastic properties in the unvulcanized state. However, if it is desired to increase the temperature range at which the molded goods can be used, the molded compositions are vulcanized.

The invention is illustrated by the following examples.

EXAMPLE 1

A polymeric composition was prepared by blending on a two-roll rubber mill a block copolymer and a crystalline copolymer in the 1:1 proportion by weight. The block copolymer was a polystyrene-polybutadiene-polystyrene block copolymer having an intrinsic viscosity of 0.77 deciliter/gram (dl./g.) measured in toluene at 30° C. and a styrene content of 38.8% by weight. The crystalline copolymer was an alternating copolymer of isoprene and acrylonitrile containing 51 mole percent of isoprene units predominantly in the trans-1,4 configuration and 49 mole percent of acrylonitrile. The copolymer showed an X-ray diffraction crystallinity of about 25% and an intrinsic viscosity of 0.6 dl./g. measured at 30° C. in dimethyl formamide.

The blend was tested for melt flow behaviour using a plastometer having an orifice, 2.095 mm. in diameter and 8.000 mm. long, through which the polymeric material was extruded at 150° C. under a load of 5 kilograms, essentially in accordance with ASTM–D–1238–65T. The amount of polymer extruded in a period of 10 minutes was called a melt flow index (M.F.I.).

Test sheets 10 cm. x 2.5 cm. x 0.1 cm. were molded from the blend under a pressure of about 100 atmospheres at a temperature of about 130° C. Dumbbells were cut from these sheets and subjected to stress-strain tests at temperatures of 25° C., 60° C. and 80° C. One sheet was aged for 48 hours at 25° C. in ASTM Oil #3 and then tested for oil swell. A further sheet was aged for 48 hours at 60° C. in ASTM Oil #3 and then tested for oil swell. A comparative experiment A was carried out using the unblended block copolymer milled and molded under the same conditions as the blend with the crystalline copolymer. The results are presented in Table I.

TABLE I

| | Blend of Example 1 | | Control Experiment A | |
|---|---|---|---|---|
| Block copolymer (parts by weight) | 50 | | 100 | |
| Isoprene/acrylonitrile copolymer (parts by weight) | 50 | | | |
| M.F.I. (grams/10 minutes) | 2.2 | | 0.2 | |
| | Unaged | Oil aged | Unaged | Oil aged |
| Raw polymer properties tested: | | | | |
| At 25° C.: | | | | |
| Tensile strength (kg./cm.²) | 240 | 98 | 276 | Jelly-like. |
| Elongation (percent) | 690 | 500 | 670 | No strength. |
| 300% modulus (kg./cm.²) | 53 | 57 | 45 | |
| Swelling in ASTM Oil #3. Weight gain (percent) at— | | | | |
| 25° C. | | 10 | | 400. |
| 60° C. | | 42 | | Dissolved. |
| At 60° C.: | | | | |
| Tensile strength (kg./cm.²) | 80 | (¹) | 110 | |
| Elongation (percent) | 790 | | 810 | |
| 300% modulus (kg./cm.²) | 25 | | 30 | |
| At 80° C.: | | | | |
| Tensile strength (kg./cm.²) | 26 | (¹) | 24 | |
| Elongation (percent) | 720 | | 690 | |
| 300% modulus (kg./cm.²) | 13 | | 18 | |

¹ Not tested.

The above results indicate that the blended composition had a melt flow index more than 10 times greater than the unblended block copolymer and a surprisingly high resistance to oil up to 60° C. showing only 42% gain in weight, when aged in ASTM Oil #3 for 48 hours at 60° C. The stress-strain properties of the unvulcanized blend were approximately as good as those of the control composition.

EXAMPLES 2-5

Four polymeric compositions were prepared by blending an alphamethylstyrene containing block copolymer and the alternating copolymer of isoprene and acrylonitrile used in Example 1. The block copolymer was an A—B—A copolymer having the following structure: poly(alphamethylstyrene)-poly(butadiene) - poly(alphamethylstyrene), an estimated molecular weight of about 54,000 corresponding to an intrinsic viscosity of 0.70 dl./g. measured in toluene at 30° C. and a melt flow index of 0.15 grams/10 minutes. The blended compositions were tested in the same manner as the composition of Example 1. For comparison, a Control Experiment B was carried out with the above described alphamethylstyrene containing block copolymer as the only polymeric component. The results are presented in Table II.

TABLE II

| Example | 2 | 3 | 4 | 5 | Control Experiment B |
|---|---|---|---|---|---|
| A—B—A block copolymer (pts. by wt.) | 10 | 25 | 50 | 75 | 100 |
| Isoprene/ACN alternating copolymer (parts by weight) | 90 | 75 | 50 | 25 | ---- |
| M.F.I. (grams/10 minutes) | 12.0 | 7.6 | 6.0 | 0.6 | 0.15 |
| Raw polymer properties: | | | | | |
| Measured at 25° C.: | | | | | |
| Tensile strength (kg./cm.$^2$) | 183 | 173 | 195 | 146 | 205 |
| Elongation (percent) | 630 | 690 | 810 | 1,000 | 1,010 |
| 300% modulus (kg./cm.$^2$) | 80 | 60 | 44 | 20 | 20 |
| Measured at 60° C.: | | | | | |
| Tensile strength (kg./cm.$^2$) | 74 | 64 | 36 | 28 | 48 |
| Elongation (percent) | 720 | 750 | 770 | 890 | 1,000 |
| 300% modulus (kg./cm.$^2$) | 22 | 22 | 17 | 12 | 14 |

The above results indicate that the blended compositions of Examples 2 to 4 have all higher melt flow index and higher modulus than the composition of Control Experiment B. Thus, they are more moldable and produce molded goods having higher resistance to deformation than the unblended block copolymer. Example 5 shows a better melt flow index, but the stress-strain properties are not as good as those of the control.

A further experiment (Experiment C) was carried out with a composition similar to Example 4 except for the isoprene/acrylonitrile copolymer which was replaced by an amorphous alternating copolymer of butadiene-1,3 and acrylonitrile containing 49 mole percent of acrylonitrile and having an intrinsic viscosity of 1.1 dl./g. M.F.I. of Experiment C was 0.25 grams/10 minutes. Tensile strength was 50 kg./cm.$^2$ at 25° C. and only 8 kg./cm.$^2$ at 60° C. and 300% modulus was 11 kg./cm.$^2$ at 25° C. and 6 kg./cm.$^2$ at 60° C. Thus, the composition of Experiment C was poorer than either Example 4 or Control Experiment B.

EXAMPLE 6

In this example, a high molecular weight block copolymer was used to prepare a 50/50 by weight blend with the alternating copolymer of Example 1. The block copolymer was poly(alphamethylstyrene) - poly(butadiene)-poly(alphamethylstyrene) containing about 30% by weight of alphamethylstyrene and having a molecular weight of about 90,000 corresponding to an intrinsic viscosity of 0.85 dl./g. The blend showed a melt flow index of 4.4 grams/10 minutes. For comparison, a block copolymer having the same alphamethylstyrene content but a lower molecular weight of 54,000 was selected for Expermient D; it showed a similar M.F.I. of 4.0 grams/10 minutes. Stress-strain properties at different temperatures were checked for both polymeric materials in the usual manner and the results are presented in Table III.

TABLE III

| | Example 6 | Experiment D |
|---|---|---|
| A—B—A copolymer m.w. 90,000 (parts by weight) | 50 | ---- |
| A—B—A copolymer m.w. 54,000 (parts by weight) | ---- | 100 |
| Isoprene/acrylonitrile copolymer (parts by weight) | 50 | ---- |
| M.F.I. (grams/10 minutes) | 4.4 | 4.0 |
| Properties: | | |
| Measured at 25° C.: | | |
| Tensile strength (kg./cm.$^2$) | 253 | 194 |
| Elongation (percent) | 700 | 1,150 |
| 300% modulus (kg./cm.$^2$) | 60 | 13 |
| Measured at 60° C.: | | |
| Tensile strength (kg./cm.$^2$) | 110 | 23 |
| Elongation (percent) | 800 | 1,000 |
| 300% modulus (kg./cm.$^2$) | 28 | 8 |
| Measured at 75° C.: | | |
| Tensile strength (kg./cm.$^2$) | 60 | 8 |
| Elongation (percent) | 750 | 1,020 |
| 300% modulus (kg./cm.$^2$) | 20 | 5 |

The above table shows that the 300% modulus values for the blend of the block copolymer and crystalline copolymer of isoprene and acrylonitrile are about 4 times the corresponding values for the block copolymer alone at similar melt flow index. In other words, the composition in accordance with this invention is considerably firmer than, and yet as moldable as, the block copolymer alone. As such it is suitable for use in melt adhesives and in particular in melt adhesive tapes for adhesive bonding of various surfaces.

What is claimed is:

1. A thermoplastic elastomeric composition comprising a blend of:
   (1) 5 to 75 parts by weight of a thermoplastic block copolymer of the general formula A—(B—A)$_n$ where A is the same or different resinous block of a polymerized olefinically unsaturated compound having a glass transition of at least 25° C., B is an elastomeric block having a glass transition temperature of less than 0° C. and $n$ is a whole number from 1 to 3, and where A constitutes from about 25 to about 65 percent by weight of the block copolymer; and
   (2) 95 to 25 parts by weight of a crystalline alternating copolymer of substantially equimolar amounts of an acrylic nitrile and a conjugated alkadiene, said alkadiene being composed of at least 40 mole percent of a 2-alkyl butadiene, at least 50% of said alkadiene being polymerized in the trans-1,4-configuration, said alternating copolymer having a crystallinity in its relaxed state at room temperature of about 5–35% as measured by X-ray diffraction.

2. The composition of claim 1 wherein the resinous block A is a polymer of an ethylenically unsaturated aromatic hydrocarbon and constitutes from about 25 to about 65 percent by weight of the block copolymer and B is a polymer of a conjugated alkadiene.

3. The composition of Claim 2 wherein the resinous block in the block copolymer is selected from the group consisting of poly(styrene), poly(alphamethylstyrene), copolymers of styrene and alphamethylstyrene and hydrogenated derivatives thereof.

4. The composition of Claim 1 wherein at least 75% of the alkadiene units in the crystalline alternating copolymer are polymerized in the trans-1,4-configuration.

5. The composition of Claim 4 wherein the conjugated alkadiene in the crystalline alternating copolymer is a mixture of isoprene and butadiene-1,3 containing between 50 and 100 mole percent of isoprene.

6. The composition of Claim 4 wherein the crystalline copolymer is an alternating copolymer of isoprene and acrylonitrile.

7. The composition of Claim 1 wherein the blend contains from about 10 to 50 parts by weight of the thermoplastic block copolymer and correspondingly from about 90 to 50 parts by weight of the crystalline alternating copolymer per 100 parts by weight of total polymer.

8. The composition of Claim 7 wherein the thermoplastic block copolymer is composed of 25-65 weight percent of styrene and 75-35 weight percent of butadiene and the crystalline alternating copolymer is composed of isoprene and acrylonitrile in which at least 75% of the isoprene units are in the trans-1,4-configuration.

9. A process for the manufacture of improved molded rubber goods which comprises molding a thermoplastic elastomeric composition as claimed in Claim 1 at a temperature of not less than about 100° C. and cooling the molded composition to a rubber elastic state at a temperature below about 80° C.

References Cited
UNITED STATES PATENTS

| | | | |
|---|---|---|---|
| 3,700,637 | 10/1972 | Finch | 260—82.5 |
| 3,523,493 | 8/1970 | Berry et al. | 260—876 B |

MURRAY TILLMAN, Primary Examiner

R. B. TURER, Assistant Examiner

U.S. Cl. X.R.

260—82.3, 82.5, 83.7, 887, 889, 894, 895